United States Patent
Wang et al.

(10) Patent No.: US 9,422,372 B2
(45) Date of Patent: Aug. 23, 2016

(54) PRODUCTION OF RESISTANT DEXTRINS

(71) Applicant: Grain Processing Corporation, Muscatine, IA (US)

(72) Inventors: Lin Wang, Iowa City, IA (US); Perminus Mungara, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 0 days.

(21) Appl. No.: 14/670,896

(22) Filed: Mar. 27, 2015

(65) Prior Publication Data
US 2015/0197580 A1      Jul. 16, 2015

Related U.S. Application Data

(63) Continuation of application No. 13/191,169, filed on Jul. 26, 2011, now abandoned.

(51) Int. Cl.
*C08B 30/18* (2006.01)
*A23L 1/30* (2006.01)
*A23L 1/308* (2006.01)
*A23L 1/054* (2006.01)

(52) U.S. Cl.
CPC .............. *C08B 30/18* (2013.01); *A23L 1/054* (2013.01); *A23L 1/308* (2013.01); *A23L 1/3008* (2013.01)

(58) Field of Classification Search
CPC ....... A23L 1/308; A23L 1/3008; A23L 1/054; C08B 30/18
USPC ........................................................ 536/103
See application file for complete search history.

(56) References Cited

U.S. PATENT DOCUMENTS

| | | | |
|---|---|---|---|
| 3,535,123 A | 10/1970 | Heady | |
| 3,783,100 A | 1/1974 | Larson et al. | |
| 7,820,418 B2 | 10/2010 | Karl et al. | |
| 2008/0175977 A1* | 7/2008 | Harrison | A23C 9/1307 426/659 |

FOREIGN PATENT DOCUMENTS

| | | | |
|---|---|---|---|
| WO | WO 2005/000905 A1 * | 1/2005 | ............. C08B 30/18 |
| WO | 2009137839 A1 | 11/2009 | |

OTHER PUBLICATIONS

Third-party submission under 37 CFR 1.290 regarding U.S. Appl. No. 14/200,972, submitted Dec. 2, 2014 (41 pages).

* cited by examiner

*Primary Examiner* — Ganapathy Krishnan
(74) *Attorney, Agent, or Firm* — Fitch, Even, Tabin & Flannery LLP

(57) ABSTRACT

A method for producing digestion-resistant dextrin from starch hydrolyzates is disclosed. In one form, the method includes mixing the starch hydrolyzate, dextrose and an acid catalyst which are allowed to react under mild vacuum with heat. The ingredients require no pre-drying and the method requires no external plasticizers.

21 Claims, 1 Drawing Sheet

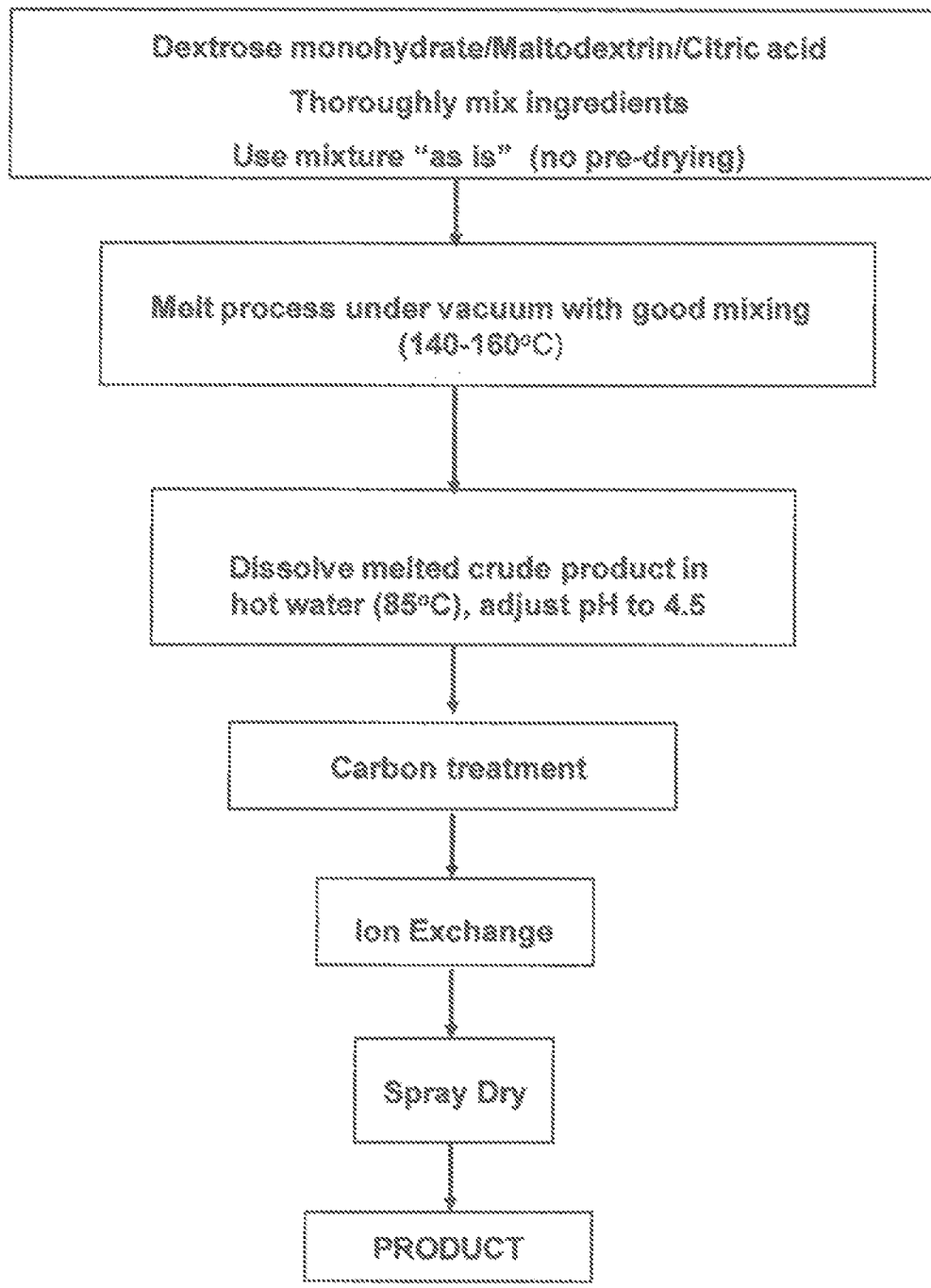

PRODUCTION OF RESISTANT DEXTRINS

RELATED APPLICATIONS

This application is a continuation of prior U.S. application Ser. No. 13/191,169, filed Jul. 26, 2011. The contents of this application are incorporated herein by reference in its entirety.

FIELD OF THE INVENTION

The present application relates to dextrins and, more particularly, to dextrins resistant to digestion and methods of manufacturing.

BACKGROUND OF THE INVENTION

Many substances are used in the manufacture of foods intended for persons and animals that restrict their intake of carbohydrates or calories. Such substances generally should be of low caloric value and of a generally non-nutritive nature. In addition, such substances should not be toxic or unwholesome. Foods or animal feeds produced using such substances preferably are formulated such that they resemble higher calorie products in texture, taste and physical appearance.

Among such substances are synthetic sweeteners. When a synthetic sweetener such as saccharin or aspartame is used in a dietetic food as a substitute for sugar, the other physical properties which would have been imparted by sugar, such as appearance, bulk mass, and texture, may also be imparted to the dietetic food by a separate ingredient. For instance, because saccharin and aspartame both are substantially sweeter than sugar, it is desirable when providing these sweeteners in commercial form to provide a low-calorie, non-nutritive carrier so that the bulk mass, appearance, and texture of the added sweetener approximates that of sugar.

Many bulking agents are known in the art. One such bulking agent that is well known in literature is polydextrose, as is taught, for instance, in U.S. Pat. Nos. 3,766,165 and 3,876,794 (both to Rennhard). Polydextrose has a substantially reduced caloric value relative to sugar (about 1 Kcal/gm), or about 25% that of dextrose. As such, polydextrose may be used as a bulking agent in connection with synthetic sweeteners and other applications.

Although polydextrose is satisfactory for many purposes as a non-nutritive bulking agent, there exist several practical difficulties concerning the use of this material. For instance, the production of polydextrose is not without difficulty. Polydextrose generally is prepared in a condensation reaction that is performed under harsh conditions. As such, the condensation reaction often results in a dark colored product that has an undesirable acidic and bitter flavor. Numerous efforts have been made to address this problem. For instance, efforts to improve on the manufacturing process of polydextrose have been suggested. For instance, in EP 404,227 (to Cooperative Vereniging Suiker Unie V.A.) and in U.S. Pat. No. 5,015,500 (to Elmore), various extrusion techniques for polydextrose are purportedly taught. Another reference, U.S. Pat. No. 5,558,899 (to Kuzee et al), purports to disclose the production of polydextrose via use of microwave energy.

Other references purport to disclose methods to improve the taste or flavor of polydextrose. For instance, U.S. Pat. No. 4,622,253 (to Torres) purportedly teaches peroxide bleaching of polydextrose in an alcohol solvent. U.S. Pat. No. 4,948,596 (to Bunich et al.) purportedly discloses a liquid/liquid extraction process for purifying polydextrose. U.S. Pat. No. 4,956,458 (to Luo et al.) is said to disclose another process said to be useful for purifying polydextrose. U.S. Pat. No. 5,191,015 (to Bunich), U.S. Pat. No. 5,677,593 (to Guzek et al.), and U.S. Pat. No. 5,831,082 (to An et al.) purport to teach chromatographic methods for purifying polydextrose. U.S. Pat. No. 5,573,794 (to Duflot) purports to disclose glucose oxidase treatment of polydextrose followed by ion exchange chromatography. Finally, U.S. Pat. No. 5,601,863 (to Bordeo et al.) and U.S. Pat. No. 5,424,411 (to Duflot et al.) disclose hydrogenated polydextrose.

At least one prior method of obtaining resistant dextrins is described is U.S. Pat. No. 5,620,873. Generally, starches are heated with a small amount of strong acid, typically hydrochloric acid, to form a pyrodextrin, in what is known as a dextrinization reaction. The reaction consists of the decomposition of the starch by the acid to small molecular weight carbohydrates like glucose, followed by random re-polymerization of the low molecular weight carbohydrate products to form dextrins which have higher molecular weight. The pyrodextrins made are a mixture of mainly glucose polymers with mixed glycosidic linkages. The mixture of the pyrodextrins is then hydrolyzed with enzymes like alpha-amylase and/or glucoamylase to convert the enzyme-digestible fraction of the dextrin mixture to smaller molecules like glucoses and other oligosaccharides. By chromatographic fraction, the smaller molecules can be separated from the larger enzyme-digestion resistant dextrins. The resistant dextrins are considered as water soluble fiber, which have much higher value, while the smaller molecules like glucose have much lower value.

Another method for making a resistant type of dextrin is disclosed by U.S. Pat. No. 5,358,729. This reference is directed to a process of preparing indigestible polysaccharides by dextrinizing a starch with an inorganic acid like hydrochloric acid in an extruder at high temperature. However, according to the inventors, the products are "not adaptable to be employed as food material due to its "stimulative taste and smell, coloring difficulty, etc."

The foregoing approaches to polydextrose production are somewhat limited in utility. For example, one principal drawback found in these approaches is that the polydextrose produced by any process typically includes substantial quantities of undesired color and flavor components, and substantial effort is required to reduce the levels of such components to acceptable levels. Moreover, the polydextrose product that is obtained in a typical condensation reaction has a low molecular weight. It would be desirable to have a low calorie bulking agent that has the properties of a higher molecular weight product such as a maltodextrin.

More recently, to address this latter concern, a number of patents, including U.S. Pat. No. 5,264,568 (to Yamada et al.), U.S. Pat. Nos. 5,358,729, 5,364,652 and 5,430,141 (all to Ohkuma et al.), and EP 368,451 (to Matsutani Chemical Industries Co. Ltd.) purport to disclose a product, commonly known as FIBERSOL®, that is formed by starch pyrodextrinization followed by enzymatic hydrolysis to leave an undigestive carbohydrate remnant. It is said that the disclosed product can be hydrogenated and/or ion exchanged to give a final product with reduced caloric content and soluble fiber benefits. This product is higher molecular weight than most polydextroses, and therefore has certain properties that rival maltodextrins. However, the product also suffers from low processing yields, significant processing complexities, and high final cost.

The inclusion of a food acceptable polyol such as sorbitol in the saccharide-carboxylic acid reaction mixtures prior to polycondensation function as internal plasticizers to reduce viscosity, minimize foaming, and also provide improved color and taste. In addition to sorbitol, other food-acceptable polyols including glycerol, erythritol, xylitol, mannitol and galactitol may be used. Although the use of polyols as plasticizers has been successful in aiding processability, consumers are increasingly objecting to their use in foods. In addition some of the polyols some have shown adverse effects including not being well tolerated by the human metabolic system.

SUMMARY OF THE INVENTION

Generally, the invention contemplates in some embodiments a method for producing digestion resistant dextrin from starch hydrolyzates, and in other embodiments contemplates dextrins as disclosed herein.

In one form, the method includes mixing a starch hydrolyzate, dextrose or another lower order saccharide, and typically an acid catalyst. The hydrolyzate and dextrose are allowed to react under mild vacuum at a temperature range of 130-180° C. to form a resistant dextrin composition. In many embodiments, the ingredients require no pre-drying, but may be used as typically supplied with a moisture content of about 10%. Also, in many embodiments no external plasticizers, such as polyols, are used.

Any suitable ratio of starch hydrolyzate to dextrose may be employed. For example, one exemplary method includes the steps of combining about 60 to about 80 wt. % dextrose, about 20 to about 40 wt. % maltodextrin and a catalytic amount of citric acid to form a mixture having a moisture content of at least about 5%; reacting the mixture at a temperature range of about 130° C. to about 180° C.; and removing moisture from the mixture using a vacuum of about 5 to about 25 inches of mercury to produce a resistant dextrin composition. The mixture may be substantially free of polyols, although polyols may be provided if desired. In some cases, the step of removing moisture occurs simultaneously with the reaction, and includes providing a vacuum of about 15 to about 18 inches of mercury. The invention further contemplates in some embodiments additional purification steps, such as treatment with of activated carbon, ion exchange, or chromatographic methods.

BRIEF DESCRIPTION OF THE DRAWINGS

FIG. 1 is a process flow diagram representing one method for manufacturing resistant dextrins, including optional purification stops.

DETAILED DESCRIPTION

Starches and hydrolyzates suitable for use in the present invention are disclosed in U.S. Patent Application Publication Nos. 2006/0149853; 2005/0282777; 2005/0048191; and 2004/0053886, all assigned to Grain Processing Corporation of Muscatine, Iowa, and all of which are incorporated by reference in their entireties. Exemplary starches include corn, potato, waxy maize, tapioca, rice, and the like. Starches are homopolysaccharides that are composed of repeating glucose units in varying proportions. Starch molecules have one of two molecular structures, which include a linear structure, known as amylose; and a branched structure, known as amylopectin. Amylose and amylopectin associate through hydrogen bonding and arrange themselves radially in layers to form granules. This ratio of amylase to amylopectin varies not only among the different types of starch, but among the many plant varieties within a type. For instance, waxy starches are those that have no more than 10% amylopectin, whereas high amylose starches are composed of essentially 100% amylose.

In connection with the present invention, the starch from which the hydrolyzate is prepared may be a waxy starch, or may be a high amylose starch, or may be any other starch found suitable for use in connection with the invention. A preferred starting material is dent corn starch. One suitable starch is sold under the trademark B200 by Grain Processing Corporation of Muscatine, Iowa. Another is B700 Unmodified/Dried Corn Starch also available from Grain Processing Corporation. The steps of obtaining and hydrolyzing the starch may be performed as part of the inventive method.

Any suitable starch hydrolyzate may be employed as a starting material. When used, the oligosaccharide preferably is a malto-oligosaccharide. By "malto-oligosaccharide" is contemplated any species comprising two or more saccharide units linked predominantly via 1-4 linkages, and including maltodextrins and syrup solids. Maltodetrins have a dextrose equivalent value (DE), of less than 20, whereas syrup solids have a DE of 20 or greater. In preferred embodiments, at least 50% of the saccharide units in the malto-oligosaccharide are linked via 1-4 linkages. More preferably, at least about 60% of the saccharide units are linked via 1-4 linkages; and even, more preferably, at least about 80% of the saccharide units are so linked. Malto-oligosaccharides may include saccharide species having an odd or even DP value, and may include some dextrose (DP 1).

The invention is applicable to derivatization of malto-oligosaccharide species in which at least a portion of the malto-oligosaccharides in the mixture have a DP value greater than 5. Preferably, at least one of the malto-oligosaccharide species in the mixture has a DP value of 8 or more. Most preferably, at least one species has a DP value of at least 10. In preferred embodiments in the invention, at least 70% of the malto-oligosaccharide species in the mixtures have a degree of polymerization greater than 5; even more preferably, at least about 80% of the malto-oligosaccharides species in the mixture have a degree of polymerization greater than 5.

Suitable malto-oligosaccharides are sold as maltodextrins under the trademark MALTRIN® by Grain Processing Corporation of Muscatine, Iowa. The MALTRIN® malto-oligosaccharides are malto-oligosaccharide products, each product having a known typical DP profile. Suitable MALTRIN® maltodextrins may serve as starting materials in accordance with the present invention and include MALTRIN® M040, MALTRIN® M050, MALTRIN® M100, MALTRIN® M150, and MALTRIN® M180. Typical DP profiles of the subject MALTRIN® maltodextrins are set forth in the following table, which illustrates the DP 1-8 profile and the overall DP profile inclusive of DI>8 malto-oligosaccharides:

|  | Typical DP profile (% dry solids basis) | | | | |
| --- | --- | --- | --- | --- | --- |
| DP profile | M180 | M150 | M100 | M050 | M040 |
| DP > 8 | 46.6 ± 4% | 54.7 ± 4% | 67.8 ± 4% | 90.6 ± 4% | 88.5 ± 4% |
| DP 8 | 3.9 ± 2% | 4.8 ± 1.5% | 4.5 ± 1.5% | 1.5 ± 1% | 2.0 ± 1% |
| DP 7 | 9.5 ± 2% | 9.1 ± 1.5% | 7.0 ± 1.5% | 1.5 ± 1% | 2.4 ± 1% |
| DP 6 | 11.4 ± 2% | 8.4 ± 1.5% | 6.1 ± 1.5% | 1.4 ± 1% | 1.8 ± 1% |

-continued

| DP profile | Typical DP profile (% dry solids basis) | | | | |
|---|---|---|---|---|---|
| | M180 | M150 | M100 | M050 | M040 |
| DP 5 | 5.9 ± 2% | 4.7 ± 1.5% | 3.3 ± 1.5% | 1.3 ± 1% | 1.3 ± 1% |
| DP 4 | 6.4 ± 2% | 5.5 ± 1.5% | 3.7 ± 1.5% | 1.1 ± 1% | 1.4 ± 1% |
| DP 3 | 8.3 ± 2% | 6.7 ± 1.5% | 4.2 ± 1.5% | 1.0 ± 1% | 1.4 ± 1% |
| DP 2 | 6.2 ± 2% | 4.8 ± 1% | 2.5 ± 1% | 0.8* ± 1% | 0.9* ± 1% |
| DP 1 | 1.8 ± 1.5% | 1.3 ± 1% | 0.7* ± 1% | 0.8* ± 1% | 0.3* ± 1% |

*MINIMUM VALUE = 0%

Each of these maltodextrins has at least 45% DP 10 or greater malto-oligosaccharide. Other suitable malto-oligosaccharide starting materials can include other malto-oligosaccharides, such as MALTRIN® M440, MALTRIN® M4510, MALTRIN® M580, MALTRIN® M550, and MALTRIN® M700, as well as corn syrup solids, such as MALTRIN® M200 MALTRIN® M250, and MALTRIN® M360.

In some embodiments of the invention the starting material can include a limit dextrin. Limit dextrins are discussed in more detail in U.S. Pat. No. 6,670,155, assigned to Grain Processing Corporation and Incorporated by reference in its entirety. Alternatively, or in addition thereto, the starting material may include another dextrin that comprises a starch that has been partially hydrolyzed by an alpha amylase enzyme but not to the theoretical or actual limit. Such dextrins are referred to herein as "prelimit dextrins."

In accordance with some embodiments of the invention, at least a portion of the starting material is hydrogenated. Suitable teachings regarding the production of hydrogenated starch hydrolyzates, specifically malto-oligosaccharides can be found in U.S. Pat. Nos. 7,728,125; 7,595,393; 7,405,293; 6,919,446; and 4613,891, each entitled "Reduced Malto-Oligosaccharides" and assigned to Grain Processing Corporation, and incorporated by reference in their entireties. Generally, when a starting malto-oligosaccharide mixture is catalytically hydrogenated, the reduced malto-oligosaccharide mixture thus formed may have a DP profile that is not substantially altered as compared with the DP profile of the starting malto-oligosaccharide mixture. Other hydrogenated starch hydrolyzates may be employed.

The reaction mixture may include mixtures of the foregoing materials, all of which are contemplated as starch hydrolyzates suitable for use as starting materials.

The starch hydrolyzate as described hereinabove is dextrinized in the presence of a lower molecular weight saccharide, i.e., a saccharide having a degree of polymerization ranging from 1 to 4. The saccharide is denoted as separate ingredient from the starch hydrolyzate even though starch hydrolyzates themselves typically include some amounts of DP 1-4 materials. Preferably, the saccharide is dextrose, optionally in combination with one or more other saccharides, such as maltose, maltotriose or maltotetraose. The dextrose may be in the form of a monohydrate.

If a mixture of saccharides is employed, the average DP of the mixture should be in the range of 1 to 4, preferably 1 to 3, and even more preferably 1 to 2. Mixtures of saccharides that can be employed include MALTRIN® M250 and MALTRIN® M360. Alternatively, the derivatizing saccharide may be maltose, maltotriose or maltotetraose in the preserves or absence of dextrose. However, dextrose is the preferred saccharide. Most preferably, the dextrose is present as 100% of the weight of the saccharides having a DP ranging from 1 to 4, but dextrose may be present in any relative amount, such as 90%, 80%, 70%, 60%, 50%, 40%, 30%, 20% or 10% by weight of saccharide having a DP from 1 to 4. Preferably, if a mixture of saccharides having a DP of 1 to 4 is employed, the saccharide includes dextrose or maltose in an amount of at least 50% by weight of the total saccharides having a DP of four or less.

Typically, an organic acid catalyst is also combined with the above noted ingredients. In one form, the organic acid catalyst is citric acid. Other acids may also be used as a catalyst, such as acetic add, adipic acid, fumaric add, gluconic acid, lactic acid, malic acid, phosphoric acid, and tartaric acid, or other food-grade acids.

The ingredients may be provided in varying amounts. For example, in one form, about 60 to about 80 wt. % dextrose or other saccharide may be combined with about 20 to about 40 wt. % maltodextrin or other hydrolyzate and a catalytic amount of citric acid, such as about 1 wt. %. In another form, about 70 wt. % dextrose is combined with about 30 wt. % maltodextrin and a catalytic amount of citric acid. In yet another form, about 75 wt. % dextrose is combined with about 25 wt. % maltodextrin and a catalytic amount of citric acid. When describing the percentages of the starch hydrolyzate and the saccharide, these percentages refer to percentages on a dry solids basis, in other embodiments, the percentages of saccharide to hydrolyzate may be 10%/90%; 20%/80%; 30%/70%; 40%/60%; 50%/50%; 60%/40%; 70%/30%; 80%/20%; or 90%/10%, or any desired range of ratios among these percentage ratios (e.g., 80%-90% saccharide and 10-20% hydrolyzate). For example, the maltodextrin may be present in an amount of 25%-75% based on the total weight of maltodextrin and dextrose.

Other ingredients (besides water) may be absent, or may be present in trace amounts, or alternatively in some embodiments other ingredients are added. For example, polyols need not be added and in many embodiments are not added. It is hypothesized that water or dextrose acts as a replacement for the external plasticizers.

As supplied, the starch, hydrolyzate and saccharide ingredients may have 5-15% moisture content, and in some cases 5-40% moisture content. The ingredients used in this method may contain their natural equilibrium moisture so that it is not necessary to dry the ingredients prior to use. Alternatively, the ingredients may be partially dried to remove some of the moisture content. It is hypothesized that the moisture content of the ingredients serves two purposes, including reducing the melting point of the mixture (thereby functioning as a plasticizer) and reducing the viscosity of the melt, thus allowing any trapped air to easily escape. As a result, the bubbling problem which is predominant in dry state reactions is ameliorated.

The reaction can take place in any reaction vessel or apparatus suitable for derivatizing the starch hydrolyzate with the saccharide. In one form, glucose monohydrate, maltodextrins and catalytic amount of citric acid, are placed in a conventional pyrodextrin reactor, as illustrated at reference number 10 in FIG. 1. The reaction may take place in a single pot reactor or may be moved between reaction vessels. The reaction may take place as a batch-type reaction or a continuous process.

After blending the ingredients, heat is applied at a temperature range of about 120-170° C. to allow the ingredients to "wet." More preferably, a temperature range of about 140-160° C. is used. After allowing the ingredients to "wet" for few minutes, moderate and controlled vacuum is applied to the mixture, as illustrated at reference number 12. For example, a vacuum of about 10 to about 25 inches of mercury, more preferably about 10-20 inches of mercury and even more preferably 15 to 18 inches of mercury is applied into the system. It is hypothesized that this controlled vacuum helps remove air pockets within the ingredient mixture without greatly affecting the moisture content. It is believed that the removal of air further helps to prevent bubbling when the mixture eventually melts. By moderating the amount of vacuum and the temperature range, water may be removed slowly and may permit the moisture to act as plasticizer in place of sorbitol. Additionally, the vacuum drives the reaction chemistry through the removal of water from the system. The reaction may be completed within 2-4 hours.

Optionally, the resulting product may then be further processed to adjust the pH, as illustrated at reference number 14. The product may then also be purified, as illustrated at reference number 16, using one or more conventional purification techniques, including, but not limited to, carbon titration, ion exchange, or chromatographic methods. Finally, the purified material may be spray dried, as illustrated at reference number 18, to achieve a final purified and dried product, as illustrated at reference number 20.

The process may be operated to provide a product having any suitable digestibility. A digestibility of from 10-20% is preferred to many embodiments, although other digestibility values are contemplated. Those skilled in the art will appreciate that various process parameters may be adjusted to affect the digestibility of the resultant product. Digestibility may be determined via a procedure adapted from Muir and O'Dea, "Measurement of resistant starch: factors affecting the amount of starch escaping digestion in vitro," *Am. J. Clinical Nutrition* 56:123-27 (1992), incorporated by reference in its entirety. Generally, this procedure includes the following steps and incorporates the reagents specified below:

1. Weigh 0.1 g of sample carbohydrate (dsb) into 50 mL centrifuge tubes.
2. Add 2 mL water to each tube % vortex gently
3. Cook sample in a boiling water bath for 15 minutes and cool.
4. Add 1 mL pepsin/HCl solution & vortex gently.
5. Incubate for 30 minutes at 37° C.
6. Neutralize with 0.5 mL NaOH.

perform steps 7a-10a on zero time sample.
7a. Add 5 mL 0.2M sodium acetate buffer & vortex.
8a. Centrifuge at 3620 rpm for 10 minutes.
9a. Decant supernatant into a 50 mL centrifuge tube.
10a. Bring up to 10 mL volume with 0.2M sodium acetate buffer & vortex.
11a. Measure glucose.

proceed with steps 7-13 on other time interval samples.
7. Add 5 mL 0.2M sodium acetate boiler and 1 mL of enzyme solution 4% vortex.
8. Incubate for specified time at 37° C. in a shaking water bath.
9. At specified time interval quench sample at 100° C. for 10 minutes.
10. Centrifuge at 3620 rpm for 10 minutes.
11. Decant supernatant into a 50 mL centrifuge tube.
12. Bring up to 25 mL volume with 0.2M sodium acetate buffer & vortex.
13. Measure glucose
14. Digestibility is determined as the amount of glucose measured as a percentage of the original starch, each measured on a dry starch basis.

Reagents

Pepsin/HCl solution—Add 0.5 g of pepsin (1:10,000, Sigma P-7000) to 400 mL deionized water. Adjust to pH 2.0 with HCl. Add to 500 mL volumetric flask and bring up to volume with water. Store in refrigerator.

Sodium acetate buffer 0.2M—Add 16.408 g of anhydrous sodium acetate to 500 mL deionized water. Adjust to pH 5.0 with glacial acetic acid. Add to 1 liter volumetric flask and bring up to volume with water.

Enzyme solution—Place 0.24 g amyloglucosidase (Sigma A-7255) and 1.0 g α-amylase (Sigma A-6880) in a 100 mL volumetric flask Bring up to volume with 0.2M sodium acetate buffer, pH 5.0. Final solution will be 28 U/mL amyloglucosidase and 10 mg/mL α-amylase.

Those skilled in the art will appreciate that by varying process equipment parameters different products with different bond profiles may be prepared. In some embodiments, the process parameters are selected such that the resultant product includes at least 20% 1-4 bonds in the product; in some embodiments, at least 25% 1-4 bonds; in some embodiments, at least 30% 1-4 bonds; in some embodiments, at least 35%: 1-4 bonds; in some embodiments, at least 40% 1-4 bonds; in some embodiments, at least 45% 1-4 bonds; and in some embodiments, at least 50% 1-4 bonds. The process likewise should be operated in a manner to form at least 45% 1-4 and 1-6 bonds in total; in some embodiments, at least 50% 1-4 and 1-6 bonds in total; in some embodiments, at least 55% 1-4 and 1-6 bonds in total; in some embodiments, at least 60% 1-4 and 1-6 bonds in total; in some embodiments, at least 65% 1-4 and 1-6 bonds in total; in some embodiments, at least 20% 1-4 and 1-6 bonds in total.

Bond methylation analysis may be performed in accordance with the procedures outlined in Hakomori, S. I., *J. Biochem.* 55:205-08 (1964), as modified by Kim et al., *Carbohydrate Research* 341:1061-64 (2006). Generally, in the methylation analysis, the material subject to analysis is exhaustively methylated using methyl iodide. This converts the free hydroxyl group to methyl ether. The methylated product is then exhaustively hydrolyzed with acid catalysis, thus creating a hydroxyl group at places where a glycosidic bond once existed. The product is then analyzed and the positions of the hydroxyl groups then determined. This represents where linkage points existed in the original products. The data is reported as t-glc, 2-glc, 3-glc, 4-glc, 6-glc, 3,4-glc, 4,6-glc, 2,6-glc+3,6-glc, 2,4-glc, 3,4,6-glc, 2,4,6-glc, 2,3,6-glc, where "t-glc" indicates a monomer resulting from a terminal glucose group, "2-glc" indicates a monomer resulting from a linkage at the 2-carbon position on the glucose ring, and so on. Plural denominations signify multiple branching points on the glucose ring; for instance, "3,4-glc" indicates a monomer formed where a branch point had existed at the 3- and 4-positions. The reducing end is subjected to another chemical step to render the reducing end similar to a similarly substituted interior unit (thus, for instance, a 1-4 linked oligomer resolves to t-glc and 4-glc). Other possible linked structures (2,3-glc or 2,3,4,6-glc) are believed to be formed in very small amounts. The methylation data does not differentiate between alpha and beta bonds, so methylation does not exactly correspond with digestibility as indicated above, but generally the larger number of 1-4 bonds and 1-6 bonds signifies greater digestibility.

A comparison of various resistant dextrins is shown below in Table 1. More specifically, Example 1 is the material resulting from the above described processing techniques. The extruded sample was produced from a prior art extrusion technique, while the polydextrose sample was produced by the large scale technique as discussed in the background. The FIBERSOL sample and NUTRIOSE samples are samples of commercially available products, also discussed in the background.

TABLE 1

Comparison of resistant dextrins.

|  | Example 1 | Extruded | FIBERSOL | NUTRIOSE | Polydextrose |
|---|---|---|---|---|---|
| % Digestibility | 10-20 | 30-40 | 4 | 15 | 5 |
| % glucose | 5-8 | 5 | 0.4 |  | 0-4 |
| DE | 14-18 | 10-13 | 8-12 | 2-10 | 0-8 |
| Mw | 3200-3800 | 3500-5000 | 3200 | 800-6000 | 1300 |
| 1-4/1-6 linkages | 36/27 | 60/20 | 48/25 | 56/38 | predom, 1-6 | no significant differences in ash, protein, fat, $SO_2$ content or pH

In subsequent example, glucose was reacted with maltodextrin using citric acid as a catalyst. In the process, a mixture of the ingredients was fed into the reactor without pre-drying. Various exemplary mixtures were prepared as found in Tables 2-4, and further processed as described below.

TABLE 2

Composition of Example 2

| Ingredient | % of total feedstock |
|---|---|
| Dextrose monohydrate | 64.35 |
| Maltodextrin (10 DE) | 34.65 |
| Citric acid anhydrous | 1.0 |

TABLE 3

Composition of Example 3 (1885-77-02A)

| Ingredient | % of total feedstock |
|---|---|
| Dextrose monohydrate | 74.25 |
| Maltodextrin (10 DE) | 24.75 |
| Citric acid anhydrous | 1.0 |

TABLE 4

Composition of Example 4

| Ingredient | % of total feedstock |
|---|---|
| Dextrose monohydrate | 69.3 |
| Maltodextrin (10 DE) | 29.7 |
| Citric acid anhydrous | 1.0 |

The starting ingredients had moisture content of about 10%. The reactor was heated to 180 to 190° C. under mixing without vacuum to allow moisture and trapped air bubbles to escape. Then under vacuum of about 10 to 12 inches of mercury, the mixture was allowed to react at between 140-160° C. for 2 to 4 hours. Under those conditions, glucose and other low molecular weight saccharides and the maltodextrin polymerized to higher MW polymer with mixture glucosidic bonds. The moisture content at the completion of the reaction was about 2%.

In subsequent examples, following the processing steps shown in FIG. 1 and as described above, the following blends were prepared. The blends were not pre-dried. During reaction, vacuum was held at 15-18 in mercury and not allowed to exceed 20 in mercury. The reacted material was dropped or transferred to a cooling belt and, after cooling, ground to desired particle size. The resulting compositions are illustrated below in Table 5.

TABLE 5

Comparison of Examples 5-7

| Item and Target | Example 5 | Example 6 | Example 7 |
|---|---|---|---|
| Formula | Dextrose monohydrate (74.25%) Maltodextrin (24.75%) Citric acid (1%) | Dextrose monohydrate (69.3%) Maltodextrin (29.7%) Citric acid (1%) | Dextrose monohydrate (74.25%) Maltodextrin (24.75%) Citric acid (1%) |
| Reaction Time | 3 hour 50 minutes | 2 hours 25 minutes | 3 hour 45 minutes |
| Reaction Temperature | 160° C. | 160° C. | 140° C. |
| Glucose Residues | 8.47 | 9.01 | 17.40 |
| PH: 2-3 | 2.89 | 2.84 | 2.92 |
| Moisture 1-2.5 | 0.95 | 0.9 | 0.8 |

Bond methylation data was determined according to the procedure outlined above for Examples 5 and 6, yielding the following

TABLE 6

Bond Methylation

| linked-glc | % Example 5 | % Example 6 |
|---|---|---|
| 1-glc | 27.5 | 28.6 |
| 2-glc | 6.1 | 6.4 |
| 3-glc | 7.0 | 7.2 |
| 4-glc | 20.0 | 18.0 |
| 6-glc | 17.9 | 18.6 |
| 3,4-glc | 0.7 | 0.8 |
| 4,6-glc | 10.5 | 9.6 |
| 2,6-glc + 3,6-glc | 6.3 | 6.6 |
| 2,4-glc | 0.9 | 1.1 |
| 3,4,6-glc | 1.5 | 1.6 |

TABLE 6-continued

Bond Methylation

| linked-glc | % Example 5 | % Example 6 |
|---|---|---|
| 2,4,6-glc | 1.1 | 1.1 |
| 2,3,6-glc | 0.4 | 0.5 |
| | 99.90 | 100.10 |

From the above, it was determined that the percentages of 1-4 and 1-6 bonds in the product of Example 5 were 35.8 and 38.9, respectively, the product of Example 6, the percentages of 1-4 and 1-6 bonds were 33.5 and 39.6 respectively.

The methods described above may provide a number of advantages over previous methods for manufacturing resistant dextrins. For example, the methods described herein may eliminate the step of making a dextrin from a starch. As noted previously, those prior art processes use environment-unfriendly hazardous strong acids like hydrochloric acid to make dextrins through a dry-roasting dextrinization process and requires pre-drying of the feedstock to 2-3% moisture content and high temperature. In many of the present methods, mineral acids are not used.

Further, the presently proposed methods may eliminate the step of hydrolyzing and removing the digestible part of the dextrin made from a starch. As noted above, prior art methods generally produced materials having a significant portion which was digestible. To increase the percentage of the non-digestible dextrins in the final product, an amylase or glucoamylase or other enzyme combinations were often used to hydrolyze the digestible part to glucose or maltose so that the non-digestible part could be separated out from the digestible part by organic solvent or alcohol precipitation, membrane separation and other separation technology based on molecular size difference. Similarly, the proposed methods may reduce waste and increase yield of the finished non-digestible products because there are digestible parts that need to be removed.

The starting materials may not need to be pre-dried, as is necessary in the prior art. Additionally, the methods proposed herein may avoid the use of polyols like sorbitol. As noted above, the moisture content of the ingredients along with the processing conditions, such as the temperature ranges and vacuum ranges, permit the materials to react without excessive foaming and without the need to use polyols.

It is thus seen that a method for preparation of resistant dextrins is provided. It is believed that the dextrins thus formed may contribute to a cholesterol-lowering effect when consumed by humans or other mammals. In some embodiments, the invention contemplates providing a resistant dextrin to a mammal for purposes of reducing the blood cholesterol value.

Uses of singular terms such as "a," "an," are intended to cover both the singular and the plurals unless otherwise indicated herein or clearly contradicted by context. The terms "comprising" "having," "including" and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed, by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A method for manufacturing a resistant dextrin composition comprising the steps of:
   combining about 60 to about 80 wt. % dextrose, about 20 to about 40 wt. % maltodextrin and a catalytic amount of citric acid to form a mixture having a moisture content of at least about 5%;
   reacting the mixture to derivatize the maltodextrin with the dextrose at a temperature range of about 130° C. to about 180° C. while removing moisture from the mixture during at least part of the reaction using a vacuum thereby forming a resistant dextrin composition.

2. The method according to claim 1, the vacuum comprising about 5 to about 25 inches of mercury.

3. The method of claim 1 wherein the mixture is substantially free of polyols.

4. The method of claim 1 further comprising the step of purifying the resistant dextrin composition using activated carbon treatment or ion exchange chromatography.

5. The method of claim 1 wherein the mixture includes about 75 wt. % dextrose and about 25 wt. % maltodextrin.

6. The method of claim 1 wherein the reacting step is at a temperature range of about 140° C. to about 160° C.

7. The method of claim 1 wherein the mixture consists essentially of dextrose, maltodextrin and citric acid.

8. The method of claim 1, wherein the mixture has a moisture content of at least about 10%.

9. The method of claim 1, wherein the dextrin composition has a digestibility ranging from 10-20%.

10. A method for manufacturing a resistant dextrin composition comprising the steps of:
    combining about 60 to about 80 wt. % dextrose, about 20 to about 40 wt. % maltodextrin and a catalytic amount of citric acid to form a mixture having a moisture content of at least about 5%;
    reacting the mixture to derivatize the maltodextrin with the dextrose at a temperature range of about 130° C. to about 180° C., said reaction being a batch-type reaction in which vacuum is applied to remove water during at least part of the reaction to thereby form a resistant dextrin composition.

11. The method according to claim 10, the vacuum comprising about 5 to about 25 inches of mercury.

12. The method of claim 10, wherein the mixture is substantially free of polyols.

13. The method of claim 10, further comprising the step of purifying the resistant dextrin composition using activated carbon treatment or ion exchange chromatography.

14. The method of claim 10, wherein the mixture includes about 75 wt. % dextrose and about 25 wt. % maltodextrin.

15. The method of claim 10, wherein the reacting step is at a temperature range of about 140° C. to about 160° C.

16. The method of claim 10, wherein the mixture consists essentially of dextrose, maltodextrin and citric acid.

17. The method of claim 10, wherein the mixture has a moisture content of at least about 10%.

18. The method of claim 10, wherein the dextrin composition has a digestibility ranging from 10-20%.

19. A method for manufacturing a resistant dextrin composition comprising the steps of:
- combining a mixture consisting essentially of dextrose and maltodextrin and a catalytic amount of citric acid to form a mixture having a moisture content of at least about 5%, wherein said dextrose is present in an amount ranging from about 60 to about 80 wt. %;
- reacting the mixture to derivatize the maltodextrin with the dextrose at a temperature range of about 130° C. to about 180° C., said reaction being a batch-type reaction in which vacuum is applied to remove water during at least part of the reaction to thereby form a resistant dextrin composition.

20. The method according to claim 19, the mixture being substantially free of polyols.

21. The method of claim 19, wherein the dextrin composition has a digestibility ranging from 10-20%.

* * * * *